United States Patent [19]
Yoshizawa et al.

[11] Patent Number: 4,802,201
[45] Date of Patent: Jan. 31, 1989

[54] CONTROL SYSTEM OF A RADIO TELEPHONE APPARATUS

[75] Inventors: Kazuhiro Yoshizawa, Kashiwa; Akio Yotsutani; Noboru Saegusa, both of Tokyo; Koichi Ito, Hino; Syozi Huse, Hachioji; Akio Toki, Hino, all of Japan

[73] Assignees: Nippon Telegraph and Telephone Corporation; NEC Corporation, both of Tokyo; Kabushiki Kaisha Toshiba, Kanagawa, all of Japan

[21] Appl. No.: 912,540

[22] Filed: Sep. 29, 1986

[30] Foreign Application Priority Data

Sep. 30, 1985 [JP] Japan .................... 60-218527

[51] Int. Cl.$^4$ ............................................ H04M 1/70
[52] U.S. Cl. ................................... 379/62; 379/63
[58] Field of Search ............... 379/61, 62, 58, 57, 379/59, 60; 355/34, 33; 340/825.44

[56] References Cited

U.S. PATENT DOCUMENTS

| | | | |
|---|---|---|---|
| 4,471,167 | 9/1984 | Cripps | 379/62 |
| 4,574,163 | 3/1986 | Zato | 379/62 |
| 4,650,928 | 3/1987 | Numata | 379/62 |
| 4,654,481 | 8/1987 | Corris et al. | 379/62 |

*Primary Examiner*—Robert Lev
*Attorney, Agent, or Firm*—Finnegan, Henderson, Farabow, Garrett, & Dunner

[57] ABSTRACT

Where a carrier wave is received from a called radio telephone set and where the identification signal of the radio telephone set coincides with a preassigned identification signal, transmission of a paging signal from a base unit is stopped. Even when the identification signals do not coincide with each other, the paging signal is sent continuously over a definite interval. Communication is established only when the signal from a handset to the base station has a predetermined strength and a proper I.D.

15 Claims, 3 Drawing Sheets

CONTROL SYSTEM OF A RADIO TELEPHONE APPARATUS

BACKGROUND OF THE INVENTION

1. Field of the Invention

This invention relates to a control system of a radio telephone apparatus, typically a cordless telephone apparatus, and particularly to transmission control of a paging signal generated from a base unit in response to a call signal sent from a telephone line.

2. Description of the Prior Art

As is well known in the art, a radio telephone apparatus, typically a cordless telephone apparatus is constituted by a radio telephone system having a handset (a handset is also called a radio telephone set) and a base unit connected to wired telephone lines for exchanging speech signals between the wired telephone lines and the radio telephone set through a radio channel. The base unit and the radio telephone set are respectively provided with a pair of corresponding transmitters and receivers. When a call signal arrives at a wired telephone line, a paging signal is transmitted through a predetermined control channel for forming a speech channel from the transmitter of the base unit, thereby to inform the radio telephone set of the fact that it is called from a wired telephone line. Then, the transmitter in the radio telephone set starts operation to send out a paging response signal through the control channel.

The base unit detects the intensity of the received paging response signal sent out from the radio telephone set, i.e., the intensity of the paging response signal at the control channel, and stops the transmission of the paging signal when the detected intensity exceeds a predetermined level, and then switches the radio channel between the base unit and the radio telephone set from the control channel to a speed channel and transmits a bell ringing signal. After transmitting a bell ringing signal, upon receiving a hook off signal from the radio telephone set, the base unit establishes a speech path between the wired telephone line and the radio telephone set.

With the prior art radio telephone apparatus, a speech path is established between the wired telephone line and the radio telephone set according to the procedures described above.

However, as the prior art radio telephone apparatus is constructed such that when the base unit receives at the control channel a carrier wave whose field strength is greater than a predetermined value, it judges that the received carrier wave as a paging response signal so as to stop the transmission of the paging signal. As a consequence, where there are two radio telephone systems (first and second) when call signals simultaneously arrive at the wired telephone line of respective radio telephone systems and, for example, when the first radio telephone set responds to the call signal, the transmission of the paging signal of the base unit associated with the second radio telephone system is also stopped by the paging response signal of the first radio telephone set, whereby the second radio telephone set cannot make any reply. A similar problem also occurs where there is a source of interfacing electric waves in a manufacturing factory, which is similar to the carrier wave transmitted from the radio telephone set, the called radio telephone set cannot respond.

SUMMARY OF THE INVENTION

It is an object of this invention to provide a novel control system for a radio telephone apparatus capable of positively calling a radio telephone set called by a wired telephone line that causes the called radio telephone set to respond.

According to this invention, there is provided a control system for a radio telephone apparatus comprising: a base unit having a radio transmitter and a radio receiver, and connected to a wired telephone line; a radio telephone set having a radio transmitter and a radio receiver, and connected to the base unit through a radio channel; call signal detecting means for detecting a call signal from the wired telephone line; paging signal transmitting means for transmitting a paging signal from the base unit to the radio telephone set in response to an output of the call signal detecting means; paging response signal transmitting means for transmitting a paging response signal containing an identification signal from the radio telephone set to the base unit in response to the paging signal; received field detecting means for detecting at the base unit an electric field of the paging response signal transmitted from the radio telephone set; identification signal detecting means for detecting coincidence between an identification signal contained in the paging response signal and a preregistered identification signal; and control means for terminating transmission of the paging signal when both output of the received field detecting means and output of the identification signal detecting means are present, and for causing transmission of the paging signal to continue when either one of the output of the received field detecting means and the output of the identification signal detecting means.

According to this invention, only when a carrier wave is received from a radio telephone set and when an identification signal coincident with that preassigned to the radio telephone set is received, transmission of a paging signal from a base unit is stopped, and the paging signal is transmitted continuously over a definite interval when the identification signal is not received. Consequently it is possible to correctly call a given radio telephone set and cause it to respond even when two or more radio telephone sets are called simultaneously and even in the presence of radio interference. Consequently, the system of this invention is especially suitable for use in a battery saving type telephone apparatus.

DESCRIPTION OF THE PREFERRED EMBODIMENT

Figure 1:
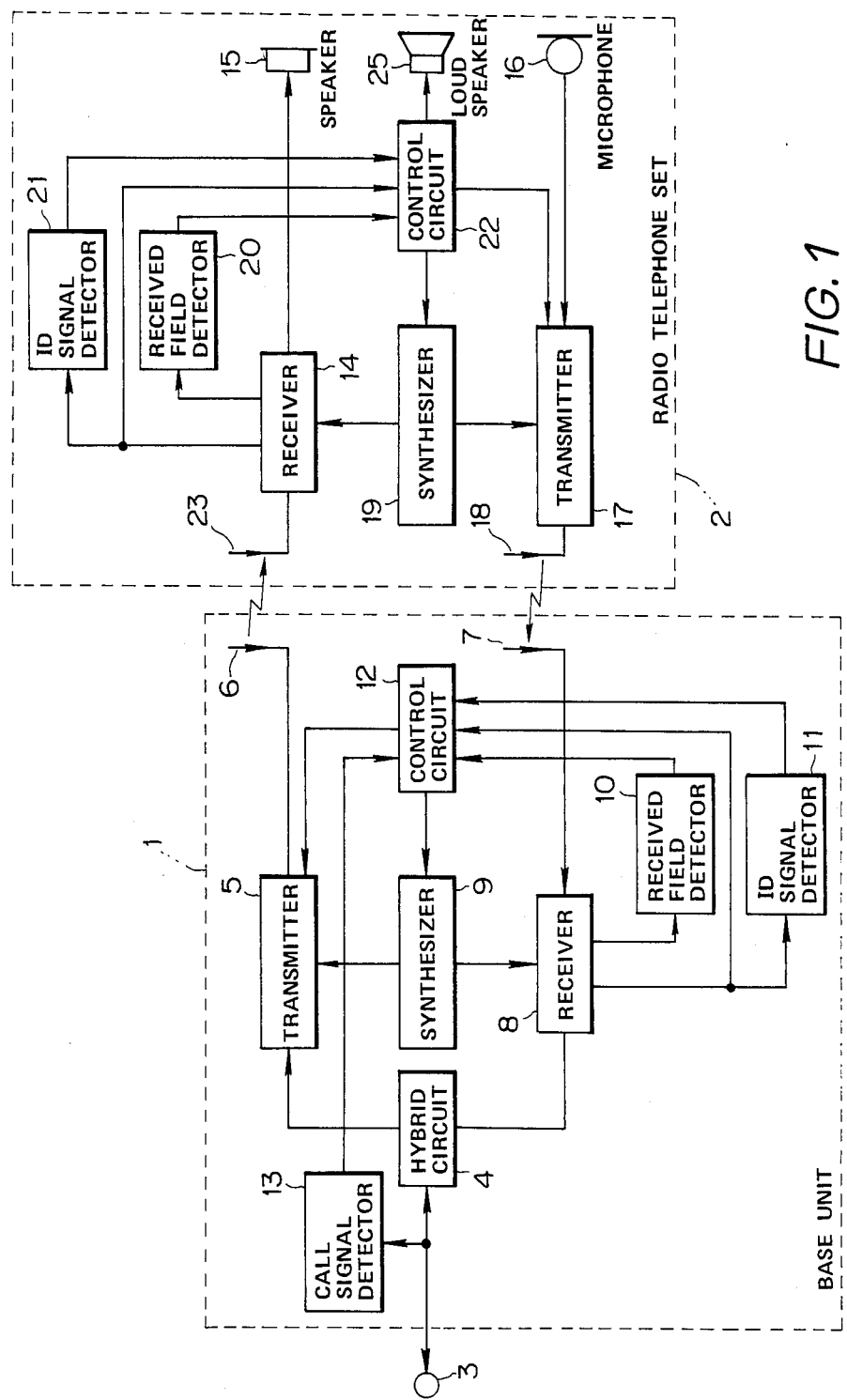
FIG. 1 is a block diagram showing one embodiment of this invention.

In the embodiment shown in FIG. 1, a base unit 1 is connected to a radio telephone set 2 through one of radio channels including a control channel and speech channels and is also connected to a wired telephone line 3.

The base unit 1 is constituted by a hybrid circuit 4, a transmitter 5, a transmitting antenna 6, a receiving antenna 7, a receiver 8, a synthesizer 9, a received field detector 10, an identification signal detector 11, a control circuit 12 and a call signal detector 13, while the radio telephone set 2 is constituted by a receiver 14, a speaker 15, a microphone 16, a transmitter 17, a transmitting antenna 18, a synthesizer 19, a received signal detector 20, an identification signal detector 21, a control circuit 22 and a receiving antenna 23.

A signal sent from the wired telephone line 3 is applied to transmitter 5 via hybrid circuit 4 to act as a modulation input for modulating a carrier wave having a frequency corresponding to a selected channel sent from synthesizer 9. The modulated carrier wave is sent to the radio telephone set through transmission antenna 6. A signal transmitted from the radio telephone set 2 is received by receiving antenna 7 and demodulated by receiver 8 and then sent to the wired telephone line 3 via hybrid circuit 4. The signal demodulated by receiver 8 is applied to received field detector 10 and identification signal detector 11. The detector 10 detects the intensity of the received field, while detector 11 judges a specific identification signal allocated to the radio telephone circuit 2. The signal demodulated by receiver 8 is applied to control circuit 12 for decoding a control signal contained in the demodulated signal and adapted to establish a speech path.

The call signal detector 13 detects a call signal contained in a signal sent from the wired telephone line 3, and informs the control circuit 12 of the fact when the call signal has been received.

In response to the output signals of the call signal detector 13, the received field detector 10 and the identification signal detector 11 together with a control signal demodulated by receiver 8 and adapted to establish a speech path, the control circuit 12 sets the frequency of the carrier wave to be outputted by synthesizer 9, and sends to the transmitter 5 a control signal, as a modulation input, necessary to establish a speech path.

In the radio telephone set 2, a signal sent from the base unit 1 is received by receiving antenna 23, demodulated by receiver 14 and then applied to speaker 15. In the same manner as in the base unit 1, the signal demodulated by receiving circuit 14 is applied to received signal detector 20, identification signal detector 21 and control circuit 22. In response to the output signals of the detectors 20 and 21 together with a control signal demodulated by receiver 14 and adapted to establish a speech path, the control circuit 22 sets the frequency of the carrier wave to be outputted by synthesizer 19, and supplies a control signal necessary to establish the speech path to transmitter 17 as a modulation input. When a bell ringing signal is received, the control circuit 22 causes a loudspeaker 25 to produce a bell tone.

A voice inputted into microphone 16 is supplied to the transmitter 17 as a modulation input and then transmitted to the base unit 1 through transmitting antenna 18.

Having described the outline of the operation of a radio telephone apparatus, the paging signal transmitting operation at the time of arrival of a call signal, which constitutes the essential portion of this invention, will be described with reference to the flow chart shown in FIG. 2.

When the base unit 1 detects a call signal from the wired telephone line 3 by the call signal detector 13, that is, when a paging from the line 3 is detected at step 24, the transmitter 5 starts sending a paging signal at step 25. At this amount, the frequency of the carrier wave of the synthesizer 9 is set to that corresponding to the control channel. It should be understood that the paging signal contains a control signal for designating a speech channel.

On the other hand, the radio telephone set 2 activates receiver 14 for a definite interval $T_1$ at step 26 so as to monitor whether a paging signal has been received from the base unit 1 or not at step 27. If no paging signal has been received during the interval $T_1$, the receiver 14 is stopped for a definite interval $T_2$ at step 30, thereafter returning to step 26 and repeating same steps. Thus, an intermittent receiving operation is carried out. However, when the paging signal from the base unit 1 is detected at step 27, the transmitter 17 starts the transmission of the carrier wave through the control channel at step 28. Then at step 29, the transmitter 17 sends to the base unit 1 an identification signal ID allocated thereto as a paging response signal. After that, at step 38 the control channel is switched to a speech channel (S-CH) designated by the base unit 1. The identification signal ID may be a digital signal comprising a plurality of bits or a tone signal of a predetermined frequency.

At step 31, when the base unit 1 detects the received electric field of the control channel with the received field detector 10 confirms that the intensity of the electric field is equal to or exceeds a predetermined value, it stops the transmission of the paging signal at step 32. When the intensity is lower than the predetermined value, a judgment is made as to whether the paging signal has been transmitted m times or not at step 33. When the result of this judgement is YES, at step 35, a further judgment is made as to whether the call signal from the wired telephone line 3 has terminated or not. When the result of this further judgment is YES, the program is returned to step 24. When the result of judgment at step 33 is NO, the operations of steps 25, 31 and 33 are repeated so as to continue the transmission of the paging signal. The reason for transmitting the paging signal m times lies in that the radio telephone set 2 operates intermittently with a halt period of t2. It is sufficient to set m such that the radio telephone set 2 receives at least twice the paging signal. If m is set too large, the control channel will be occupied too long, which is of course undesirable.

More particularly, m should be determined to satisfy the following equation.

$$a \times m \geq 2(T_1 + T_2) + a \tag{1}$$

where a (sec) is the length of the paging signal, $T_1$ and $T_2$ operative period and halt (inoperative) period of the radio telephone set.

After detecting that the received electric field exceeds the predetermined value at step 31 and halting the transmission of the paging signal at step 32, the base unit 1 judges whether the identification signal of the radio telephone set 2 coincides with a preassigned identification signal or not at step 34. When these identification signals coincide with each other, the control channel is switched to the speech channel (S-CH) and a bell ringing signal is transmitted at step 37. When the radio telephone set 2 receives the bell ringing signal, the loudspeaker 25 produces a bell tone at step 40. In response to the bell tone, when a called party hooks off a handset including the speaker 15 and the microphone 16, a judgment is made as to whether the handset was hooked off or not at step 41. When the handset has been hooked off, the radio telephone set 2 transmits a hook off signal at step 42, and speech condition is established.

At step 43, a judgment is made as to whether the base unit 1 has received the hook off signal from the radio telephone set 2 and when the result of judgment is YES, the transmission of the bell ringing signal is terminated at step 44, thus establishing a speech condition.

Even when the base unit 1 has received an electric field of a level exceeding the predetermined level, where its identification signal does not coincide with that of the radio telephone set, and it is judged that the received electric field is lower than the predetermined level at the control channel at step 46, the program is returned to step 24. While the call from the wired telephone line 3 is still continuing, similar paging operation is repeated until the paging signal is transmitted by m times.

Where there are two sets (first and second) of radio telephone sets 2, and when call signals arrive simultaneously to the wired telephone lines of respective sets, and the first radio telephone set, for example, responds first, the paging operation will be repeated because the identification signals do not coincide with each other for the second radio telephone set. For this reason, response by the second radio telephone set is possible.

Figure 2:
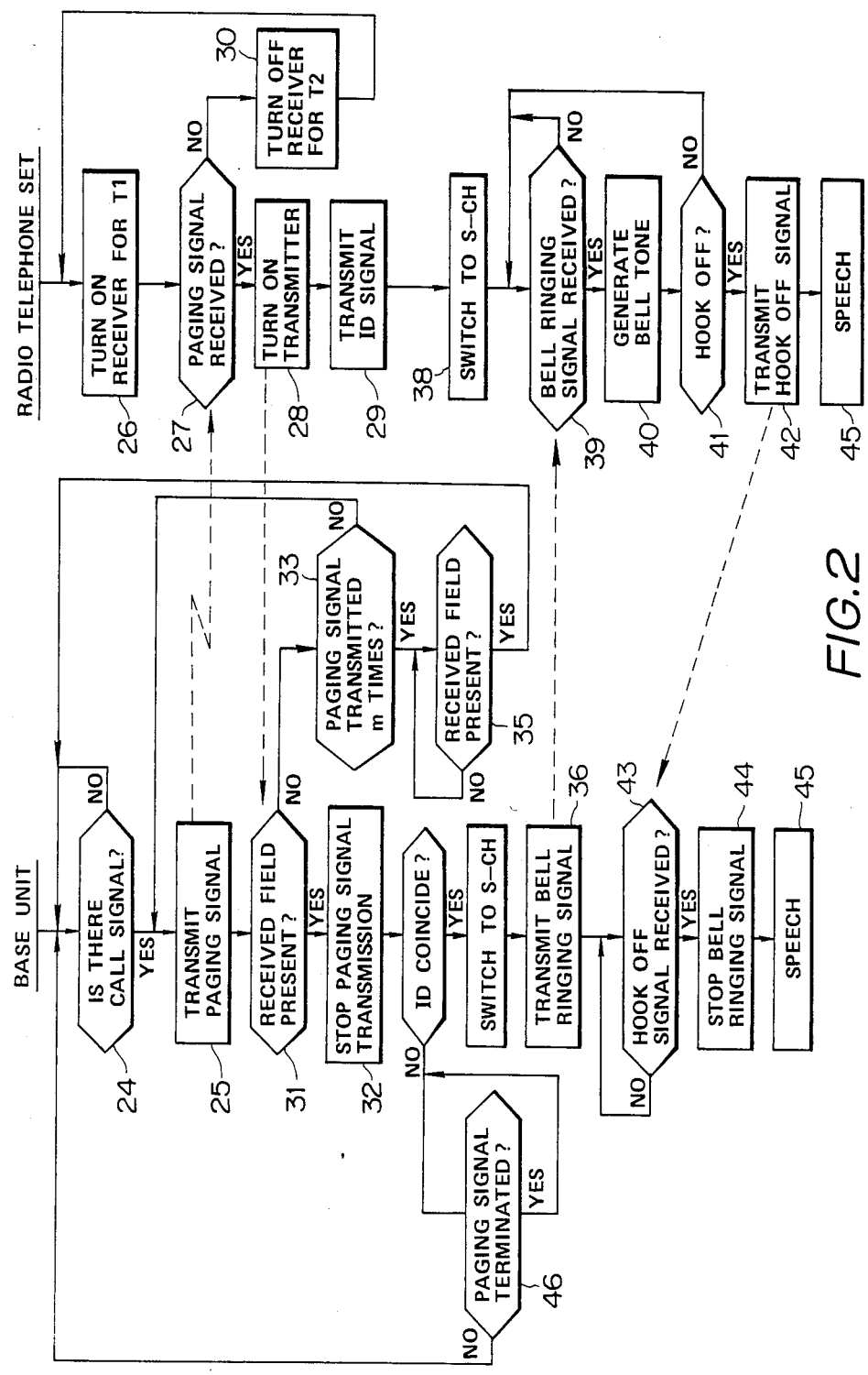
FIG. 2 is a flow chart showing a paging operation.
Figure 3:
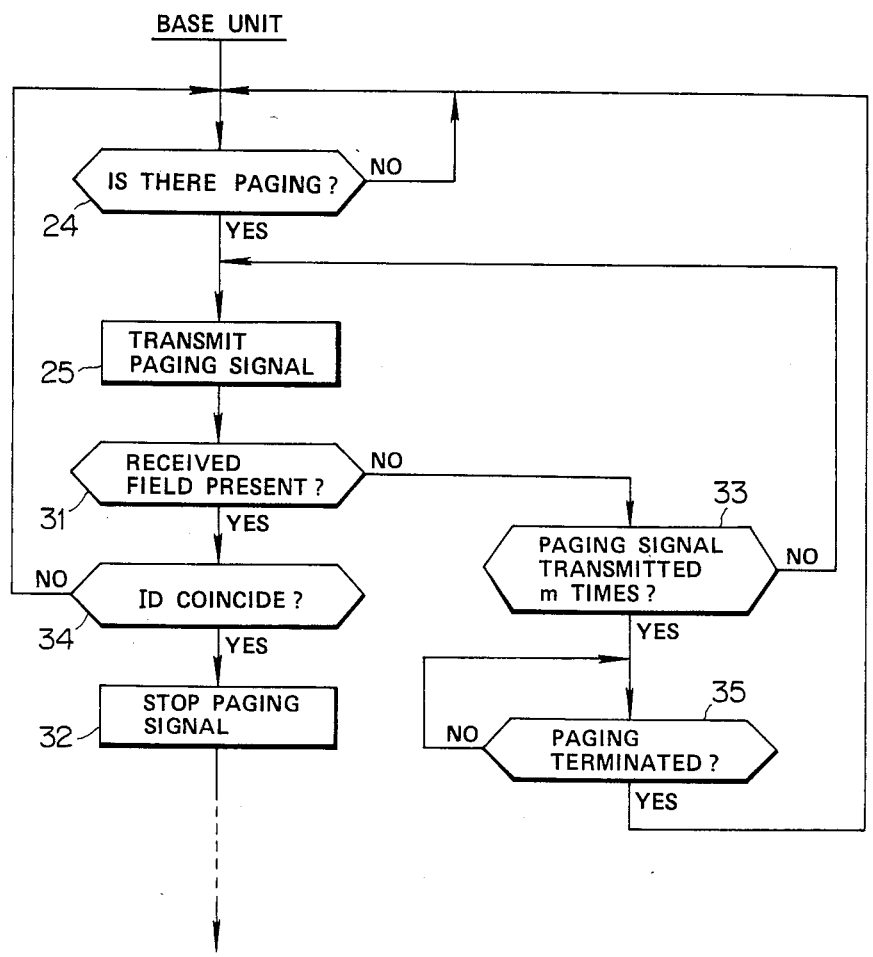
FIG. 3 is a flow chart showing a modified paging operation.

FIG. 3 shows a flow chart showing a modified paging operation, which is different from the flow chart shown in FIG. 2 in that the orders of steps 32 and 34 are interchanged. This interchanging of steps is possible when transmission and reception of the signals are made dual, in which while transmitting a paging signal, the reception of the paging response signal is made at the same time thereby enabling continuous transmission of the paging signal until the identification signals come to coincide with each other.

More particularly, in the modified embodiment when it is detected at step 31 that an electric field is received, that is, the received electric field exceeds the predetermined level at the control channel, then a judgment is made at step 34 as to whether or not the identification signal of the paging response signal coincides with the preassigned identification signal. When these identification signals are judged not to coincide with each other, the operation returns to step 24, that is, the paging signal is kept transmitted intermittently. When these signals are judged to coincide with each other, the operation returns to step 36 of FIG. 2 and the same steps will be taken thereafter.

This modified embodiment enables positive response for a called radio telephone set.

What is claimed is:

1. A radio telephone system for use with a wired telephone system, comprising:
    a base unit connected to the wired telephone system;
    a handset;
    means in said base unit, responsive to a call from said wired telephone system, for broadcasting paging signals on a first communications channel;
    means in said handset for receiving paging signals from said base unit;
    means in said handset, responsive to said received paging signals, for broadcasting on said first communications channel paging response signals having handset identification data;
    means in said base unit for receiving said paging response signals from said handset;
    field detecting means in said base unit, responsive to said base unit receiving means, for generating a first detection signal when the signal strength of said received paging response signals is stronger than a predetermined signal strength;
    means in said base unit, responsive to said base unit receiving means, for generating a second detection signal in response to the detection of said identification data in said received paging response signals; and
    means, responsive to the presence of said first detection signal and said second detection signal, for establishing a communication link between said base station and said handset on a second communications channel.

2. The radio telephone system of claim 1 wherein said paging signals include frequency information of said second communications channel.

3. A radio telephone system for use with a wired telephone system, comprising:
    a base unit connected to the wired telephone system;
    a handset;
    means in said base unit, responsive to a call signal on the wired telephone system, for broadcasting paging signals containing frequency information of at least one communications channel;
    means in said handset for receiving said paging signals;
    means in said handset, responsive to said handset receiving means, for broadcasting paging response signals having handset identification data;
    means in said base unit for receiving said paging response signals;
    means in said base unit, responsive to said base unit receiving means, for generating a first detection signal when the signal strength of said received paging response signals is stronger than a predetermined signal strength;
    means in said base unit, responsive to said base unit receiving means, for generating a second detection signal in response to the detection of said handset identification data in said received paging response signal;
    means in said base unit, responsive to said means for generating a first detection signal and said means for generating a second detection signal, for broadcasting and receiving signals over said at least one communication channel designated by said frequency information in response to the presence of both said first detection signal and said second detection signal; and
    means in said handset for broadcasting and receiving signals over said at least one communications channel designated by said frequency information after broadcasting said paging response signals.

4. The radio telephone system of claim 3 wherein said base unit means for broadcasting paging signals includes means for terminating said means for broadcasting when said first and second detection signals are simultaneously present.

5. The radio telephone system of claim 3 further comprising a handset power supply having a battery power source, wherein said power supply intermittently energizes said handset receiving means during a time interval $T_1$ over each time interval of $T_1+T_2$ duration.

6. The radio telephone system of claim 5 wherein said base unit means for broadcasting paging signals includes means for repetitively broadcasting a predetermined number of paging signals over a time period during which said handset is intermittently energized.

7. The radio telephone system of claim 5 wherein said base unit includes means for broadcasting a predetermined number of paging signals while said first detection signal is not present.

8. The radio telephone system of claim 6 wherein said predetermined number of times, represented by m, is determined according to the following formula:

$$a \times m \geq (T_1 + T_2) + a$$

where a is the time duration of said paging signals;
T$_1$ is the time period with power supplied by said power supply; and
T$_2$ is the time period with no power supplied by said power supply.

9. A method of controlling a radio telephone system having a handset and a base unit connected to a wired telephone system, comprising the steps of:
broadcasting, from the base unit, paging signals on a first communications channel;
receiving, in the handset, said paging signals from the base unit;
broadcasting, from the handset, paging response signals having handset identification data, on said first communications channel;
receiving in the base unit said paging response signals from the handset;
generating, in the base unit, a first detection signal when the signal strength of said received paging response signals is stronger than a predetermined signal strength;
generating, in the base unit, a second detection signal in response to the detection of said identification data in said received paging response signals; and
establishing a communication link between said base unit and the handset on a second communications channel when said first and second detection signals are present.

10. The method of controlling a radio telephone system of claim 9 wherein said step of broadcasting paging signals includes broadcasting frequency information of said second communications channel as part of said paging signal.

11. A method of controlling a radio telephone system having a handset and a base unit connected to a wired telephone system, comprising the steps of:
broadcasting, from the base unit, paging signals containing frequency information of at least one communications channel, in response to a call signal on the wired telephone system;
receiving said paging signals by the handset in a handset receiver;
broadcasting, from the handset, paging response signals having handset identification data, in response to said paging signals;
receiving in the base unit said paging response signals;
generating in the base unit a first detection signal when the signal strength of said received paging response signals is stronger than a predetermined signal strength;
generating in the base unit a second detection signal in response to the detection of said handset identification data in said received paging response signal;
broadcasting and receiving signals by the base unit over said at least one communications channel designated by said frequency information in response to the presence of both said first detection signal and said second detection signals; and
broadcasting and receiving signals by the handset over said at least one communications channel designated by said frequency information after broadcasting said paging response signals.

12. The method of controlling a radio telephone system of claim 11 further including the step of supplying power intermittently from a battery power supply to said handset receiver during a time interval T$_1$ over each time interval of T$_1$+T$_2$.

13. The method of controlling a radio telephone system of claim 12 wherein said step of broadcasting paging signals includes repetitively broadcasting a predetermined number of paging signals over a time period during which said handset receiver is intermittently supplied with power.

14. The method of controlling a radio telephone system of claim 12 wherein said step of broadcasting paging signals includes broadcasting a predetermined number of paging signals while said first detection signal is not present.

15. The method of controlling a radio telephone system of claim 13 wherein said step of broadcasting a predetermined number of times includes determining said predetermined number of times, represented by m, according to the following formula:

$$a \times m \geq (T_1 + T_2) + a$$

where a is the time duration of said paging signals;
T$_1$ is the time period with power supplied by said power supply; and
T$_2$ is the time period with no power supplied by said power supply.

* * * * *